Jan. 13, 1970    R. V. WILLIAMS    3,490,037
MICROWAVE MEASUREMENT OF MATERIAL THICKNESS
Filed May 2, 1966    2 Sheets-Sheet 1
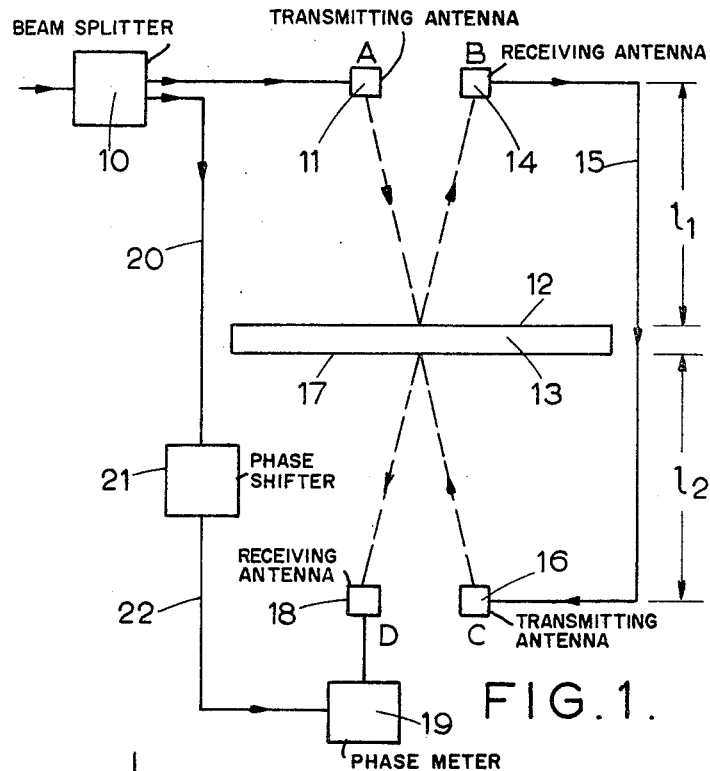
FIG.1.
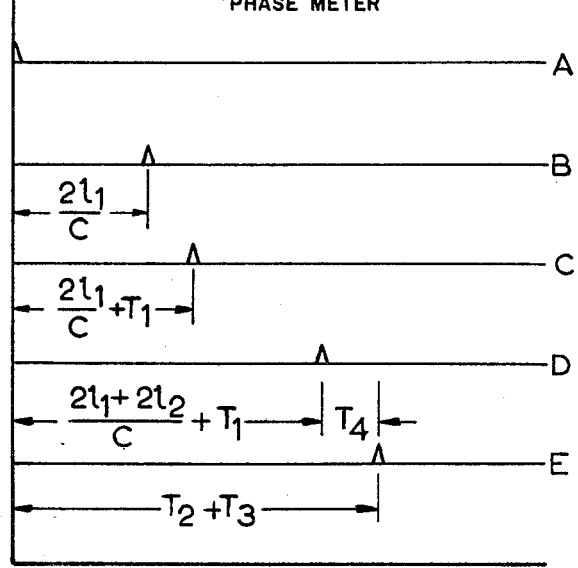
FIG.2.    TIME
INVENTOR
Reginon Vaughon Williams
BY
Watson, Cole, Grindle + Watson
ATTORNEYS

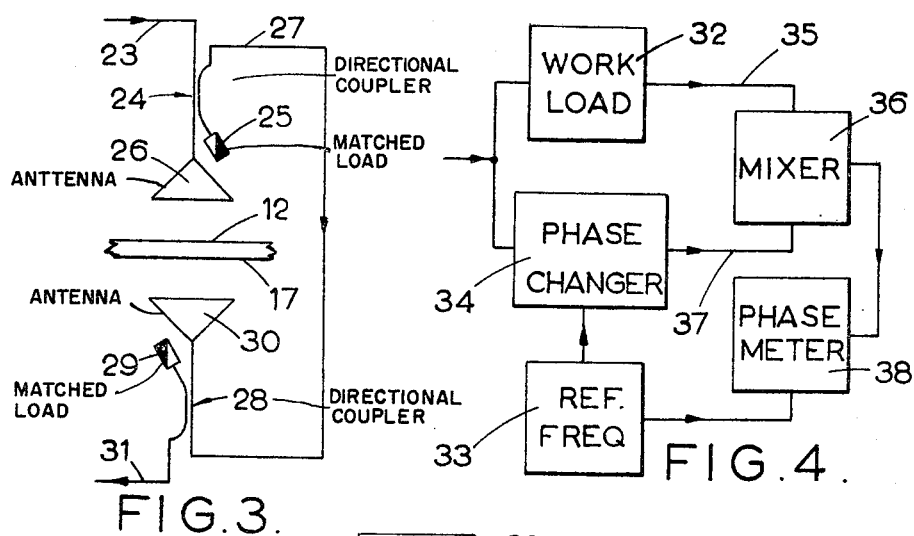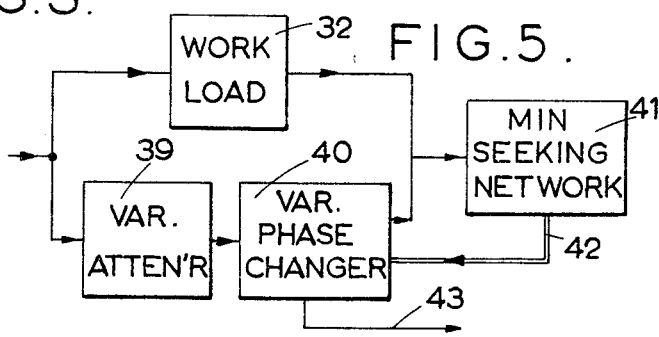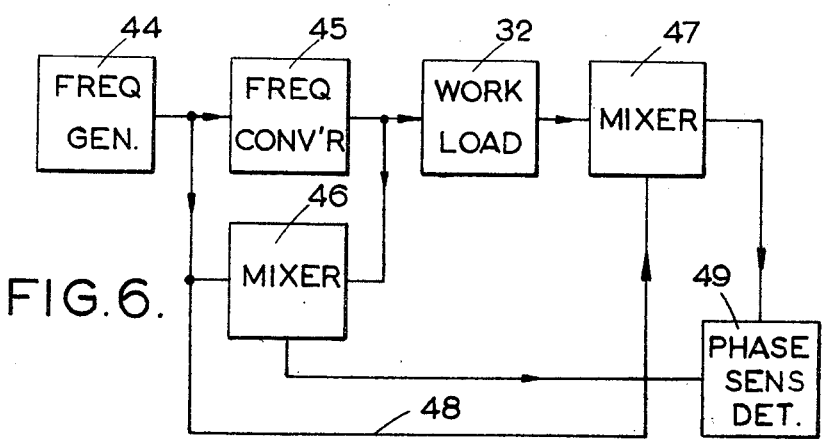

United States Patent Office 3,490,037
Patented Jan. 13, 1970

3,490,037
MICROWAVE MEASUREMENT OF MATERIAL THICKNESS
Royson V. Williams, Thorpe, Egham, England, assignor to The British Iron and Steel Research Association, London, England, a British company
Filed May 2, 1966, Ser. No. 546,781
Claims priority, application Great Britain, Apr. 30, 1965, 18,271/65
Int. Cl. G01r 27/04
U.S. Cl. 324—58.5                              3 Claims

ABSTRACT OF THE DISCLOSURE

A microwave system for measuring the thickness of material converts a phase change in a microwave beam into a phase change in a lower frequency by using an independent reference frequency source. A phase changing circuit converts a microwave beam frequency to another frequency differing from the microwave beam frequency by the reference frequency and the converted output signal is mixed with the reflected microwave beam to provide a phase displacement which is representative of the thickness of an object.

---

This invention relates to a method of, and apparatus for, measuring the thickness of an object or section without the use of elements which are in actual contact with the object or section to be measured.

There are various processes in the manufacture of iron and steel in which it is required to measure the thickness of a section and where, on account of the speed of movement of the section or its temperature, physical contact cannot be made with the section for the purpose of measuring its thickness. For example, the rolled material coming from a plate mill travels at a considerable speed and the thickness of the rolled section must be accurately measured without the necessity for stopping it. It has been found impossible to devise a contact arrangement which has sufficiently rapid resolution to measure the thickness accurately, partly because it has been found impossible to devise apparatus which will remain firmly in contact with the moving section to enable accurate measurement to be made. Usually the combination of speed and the temperature of the material make it impossible to measure the thickness accurately by any contact method.

In those circumstances in which material to be measured is not travelling at high speed the temperature at which the material has to be worked usually makes it impossible to use contact arrangements for measurement.

In these circumstances it is advantageous to use a form of radiation which can be reflected by the object or section to be measured, so that mechanical contact is unnecessary. Some radiation gauges are known in which use is made of X-rays, γ-rays, and β-rays, but in most of these methods the amount of radiation becomes a hazard to health and elaborate safety precautions have to be taken when making use of them.

There is consequently a requirement for a method which can be used to measure accurately the thickness of sections which are travelling at high speed, or which are at elevated temperatures, or both, which does not involve contact measurement and makes use of a form of radiation which is not harmful, either to the operator or to the material of which the section to be measured is made. The principal object of the invention is to provide such a method, and apparatus by which the method may be carried out. A subsidiary object is to provide a method and apparatus which enable such measurement to be carried out with accuracy even when a section is travelling at high speed.

According to the invention a method of measuring the thickness of an object or section comprises the steps of directing a microwave beam on to one surface of the object and reflecting it therefrom, then directing the beam on to the opposite surface of the object and reflecting it therefrom, and comparing the phase of the beam after reflection with the phase of the beam before reflection, whereby the difference in phase indicates the thickness of the object.

Apparatus for carrying out the method defined above comprises a beam splitter to which the microwave beam may be applied, first means for directing one part of the split beam on to one surface of the object and receiving it after reflection therefrom, second means for directing the said one part of the split beam on to the opposite surface of the object and receiving it after reflection therefrom, and means to which the said one part and the other part of the beam are applied for measuring the phase displacement of the said one part of the beam due to its reflection from the surfaces of the object.

The features and advantages of the invention will be apparent from the following description of several embodiments thereof, given by way of example, with reference to the accompanying drawings.

In these drawings—

FIGURE 1 is a diagrammatic illustration of an arrangement for measuring the thickness of a section of material;

FIGURE 2 is a diagram illustrating the time progression of the method of measurement;

FIGURE 3 shows an alternative arrangement of the transmitting and receiving means;

FIGURE 4 shows another arrangement for carrying out the measurement;

FIGURE 5 shows a further arrangement for carrying out the measurement; and

FIGURE 6 shows still another arrangement for carrying out the measurement.

Referring to FIGURE 1, a microwave beam, generated by means not shown, is passed through a beam splitter 10 and is split into two parts. One part of the split beam passes to a transmitting antenna or horn 11 which directs the microwave beam on to one surface 12 of a plate 13, which is the object whose thickness is to be measured. The microwave beam is reflected at the surface 12 and the reflected beam is detected by the receiving antenna or horn 14 and is transmitted through a waveguide 15 to a second transmitting antenna or horn 16. The microwave beam is then directed by the antenna or horn 16 on to the opposite surface 17 of the plate 13 and the beam reflected from the surface 17 is detected by a second receiving antenna or horn 18, from which it is passed through a further waveguide to a phase meter 19. At the same time the other part of the split beam issuing from the beam splitter 10 passes through a waveguide 20 to a phase shifting device 21 and thence through a further waveguide 22 to the phase meter 19.

The phase meter 19 measures the phase difference between the two portions of the beam, that is, the phase difference between the signal coming from the receiving aerial 18 and the signal coming from the device 21, and the phase difference between the two signals is registered by the phase meter 19 and provides an indication of the thickness of the plate.

The phase meter 19 may be calibrated in thicknesses from a knowledge of the wavelength of the microwave signal. The zero reading of the instrument may be set by placing a skin or membrane between the pairs of antennae in place of the plate 13, the skin or membrane being very thin so that it may be regarded as of negligible thickness. In this condition, when the beam is transmitted the reading of the phase meter is equivalent to zero plate thickness, and the phase shifting device 21 may then be set to give a zero thickness reading on the phase meter, so that the adjustment of the device 21 has the effect of cancelling out all unwanted phase shifts in the apparatus. The skin is then removed and thereafter when a section to be measured is passed between the pairs of antennae the phase meter 19 gives a direct reading of the thickness of the section.

Referring to FIGURE 2, the time progression of the microwave beam in travelling from the phase splitter 10 to the phase meter 19 is illustrated.

It is to be assumed that the pips shown illustrate the progress of one cycle of the ultra high frequency wave and the progression of the pip from left to right illustrates the progress of the cycle through the measuring apparatus. Line A illustrates the pip leaving the antenna 11 at zero time. In line B the beam has been directed to and reflected from the surface 12 and has reached the receiving antenna 14. The distance travelled by the beam is $2l_1$, where $l_1$ is the distance of the surface 12 from horns 11 and 14 as indicated in FIGURE 1. The time taken to travel this distance is $2l_1/C$ where C is the transmission speed, that is, the speed of light or $3 \times 10^8$ metres per second. The beam then travels through the waveguide 15 to the antenna 16, and this takes a further time $T_1$ as shown in line C. The beam is then directed on to the surface 17 and reflected therefrom to arrive at the antenna 18 at a time $$\frac{2l_1}{C}+\frac{2l_2}{C}+T_1$$

after leaving the antenna 11, where $l_2$ is the distance from antenna 16 or 18 to the surface 17, as shown in FIGURE 1.

The second portion of the wave leaving the beam splitter 10 travels through waveguide 20 to the phase shifting device 21 and on through the further waveguide 22 to the phase meter 19. The time taken to travel along the waveguides from the beam splitter 10 to the phase meter 19 may be expressed as $T_2$. The phase shifter 21 introduces a time delay $T_3$, which is initially adjusted to give a zero reading on the phase meter when virtually no thickness is being measured, as previously described. Thus, the total time for the other part of the split beam to reach the phase meter 19 is $T_2+T_3$ as shown in line E of FIGURE 2.

The difference in arrival time at the phase meter of the marker pip which has travelled through the phase shifter 21 is shown as a time indication $T_4$ as between lines D and E. Since the wavelength of the transmission is known the phase meter 19 may be calibrated directly in terms of thickness of the plate and the value $T_4$ can be read off the phase meter 19 directly as a thickness value. The phase meter 19 can be arranged to indicate values directly on a scale or to feed signals corresponding to the values to any desired display arrangement. It is important to note that the measurement is independent of the relative values of $l_1$ and $l_2$ so that the object to be measured can move freely between the pairs of antennae, that is, up and down in the drawing, without affecting the accuracy of the measurement. This is important in steel producing processes since a ribbon or plate which is being rolled may well move up and down as it travels, although its thickness may be quite constant.

The phase meter will, of course, be unable to differentiate between the cases where the thickness of the plate is less than one wavelength and when it is less than two or more wavelengths by the same amount. Consequently, the phase meter will only indicate thickness up to a maximum of one wavelength, and the operator will obviously be able easily to determine the number of whole wavelengths included in the thickness of the plate in addition to the fraction of a wavelength which was measured, because the wavelength is known and it is easy to see whether thickness exceeds one or two or any other number of whole wavelengths.

The accuracy of measurement depends primarily upon the accuracy of the phase meter. A suitable phase meter which is readily available has an accuracy of measurement of ±4 electrical degrees. Thus, if a wavelength of 3 cms. is used the error in measuring the thickness is $$\pm\frac{4}{360}\times\frac{3}{2}$$

cms. and this is equivalent to ±0.0065 inch. This error is independent of the section thickness. For higher accuracy a shorter wavelength may be used, for example 8 mms., in which case the accuracy of measurement is ±0.0025 inch, which represents a fractional error of ±1 percent of the thickness of a one-quarter inch thick plate.

In the illustrations of the time progression of the beam in FIGURE 2, no allowance has been shown for the time of transmission in the short lengths of waveguide between the beam splitter 10 and the antenna 11 and between antenna 18 and the phase meter 19. Actually in a practical arrangement there will be some time delay in these waveguides and this time delay will automatically be cancelled out in the initial adjustment of the phase shifting device 21 to obtain the zero setting.

In FIGURE 1 an arrangement using two transmitting antennae and two receiving antennae is shown. The use of two elements on each side of the plate or section to be measured is not essential, as indicated in FIGURE 3, in which only one antenna is used in conjunction with a directional coupler on each side. The incoming part of the split beam from the beam splitter 10 arrives via a waveguide 23 and passes to a directional coupler which is generally indicated by reference 24. In this coupler one half of the signal passes straight on to the antenna and the other half is transferred in the coupler so that it is fed to a matched load 25 in which it is absorbed. The half of the split beam which passes on to the antenna 26 is directed on to the surface 12 and reflected from this surface back to the antenna 26. One half of the beam passes back through the line 23 to the beam splitter, where it is absorbed, and the remaining half of the returning signal is transferred in the directional coupler and travels along a waveguide 27 to a further directional coupler indicated by reference 28. Here one half of the beam is passed to and absorbed by a further matched load 29 and the remaining half passes to the second antenna 20 from which it is directed to the surface 17 and reflected back to the antenna 30. The beam from the antenna 30 again passes the directional coupler 28 in which one half is passed back along the waveguide 27 while the remaining half (which is only one-sixteenth part of the original signal arriving along the waveguide 23) passes through a further waveguide 31 to the phase meter 19.

FIGURES 4, 5 and 6 show three arrangements for carrying out the phase measurement. In each of these a block 32 represents the parts and connections of elements 10, 11, 13, 14, 15, 16 and 18, that is to say, the apparatus for directing and reflecting the beam to and from the two surfaces 12 and 17.

In the arrangement of FIGURE 4 a source of reference frequency 33 is provided. The reference frequency is very much lower than that of the microwave beam and is preferably within the audio frequency range. The one part of the microwave beam is applied to the apparatus 32 and the other part of the beam is applied to a rotating phase changer 34 which produces a cyclic phase change in the part of the beam applied to it, this phase change being carried out at the rate of one cycle for each cycle of the reference frequency. The phase changer 34 may be an electronic device or a mechanical device of a kind disclosed in U.S. Patent No. 2,438,119 and known as the Fox phase changer. Its effect is to convert the beam frequency to another frequency which differs from the beam frequency by the reference frequency.

The one part of the beam after reflection is passed by a waveguide 35 to a mixer 36 to which the other part of the beam from the phase changer 34 is also applied via a waveguide 37. From the mixer 36 a difference frequency is derived which is equal to the reference frequency but is phase displaced from the reference frequency by an amount corresponding to the phase displacement produced in the apparatus 32 due to the double reflection of the one part of the beam. The output of the mixer 36 and the reference frequency are applied to a phase meter 38 in which the phase displacement due to the double reflection of the microwave beam is measured, the amount of phase displacement indicating the thickness of the plate 13.

The reason for converting the phase change in the microwave beam into a phase change in an audio frequency is that it is possible to measure the phase change much more accurately at audio frequency.

In the arrangement of FIGURE 5 the one part of the microwave beam is passed to the apparatus 32 and the other part of the beam is applied to a variable attenuator 39. From the attenuator 39 the one part of the beam is passed to a variable phase changer 40 by which any desired phase variation may be applied. The reflected part of the beam from the apparatus 32 and the output from the variable phase changer 40 are applied to a minimum seeking network 41 which, by means of a servo arrangement including a mechanical drive 42, can control the variable phase changer 40. The network 41 drives the variable phase changer 40 in order to produce the minimum phase difference between the beam after reflection, from the apparatus 32, and the beam before reflection. Consequently when a zero (or near zero) phase difference is produced the amount by which the phase of the beam before reflection has been changed by the phase changer 40 is a measure of the phase change in the one part of the beam caused by reflection in the apparatus 32. This is indicated by any suitable indicating means (not shown) fed from the phase changer 40 by line 43 and is a measure of the thickness of the plate 13.

The variable attenuator 39 is an optional element and may be included in any of the embodiments. The one part of the beam, in passing through the apparatus 32, may be substantially attenuated, particularly if the antenna system shown in FIGURE 3 is used, and in some systems of measurement greater accuracy is achieved if the other part of the beam is also attenuated so that its amplitude is approximately equal to that of the one part.

FIGURE 6 shows a further arrangement for measuring the phase difference produced by reflecting the microwave beam. It comprises a source 44 to produce a first frequency. The first frequency is fed to a frequency converter 45 which converts the first frequency to a higher frequency and suppresses its side bands. The converted frequency constitutes the microwave beam. The first frequency and the microwave beam are applied to a first mixer 46 from which a difference frequency is derived. The microwave beam is also applied to the apparatus represented by block 32, the output of the apparatus 32 constituting the beam after reflection. This is applied to a second mixer 47 to which the first frequency is also applied over a path 48, so that the difference frequency derived from the mixer 47 is identical with the difference frequency derived from the mixer 46, but the difference frequency derived from the mixer 47 is phase displaced due to reflection of the one part of the microwave beam in the apparatus 32. The two difference frequencies from the mixers 46 and 47 are both applied to a phase sensitive detector 49 in which the phase difference produced in the beam by the double reflection is determined, and this phase difference is an indication of the thickness of the plate 13.

When measuring the profile in cross-section of hot rolled products it is possible to use a series of antennae, in pairs, electrically to scan across the products. It will, however, be evident that when measuring the thickness of a flat object such as the plate 13, the sensitivity of the measurement can be considerably increased by reflecting the beam two or more times from the said one surface and the same number of times from the said opposite surface. For example, if the beam is reflected twice from each surface then the phase displacement for a given change in thickness will be double that which is produced if the beam is only reflected once from each surface. On the other hand, the range of thickness measurable at a given wavelength is halved. This, however, is unimportant, since the thickness measured may include any number of whole wavelengths, as explained earlier.

I claim:
1. Apparatus for measuring the thickness of an object comprising:
   a first frequency signal source,
   a converter for converting the first frequency signal to a microwave signal with suppressed sidebands,
   means for directing said converted signal as a beam onto one surface of the object and reflecting it therefrom and for directing the reflected energy onto the opposite surface of the object and reflecting it therefrom,
   a first mixer responsive to the first frequency signal and said converted microwave signal to obtain a first difference frequency signal,
   a second mixer responsive to the first frequency signal and the reflected energy from said opposite surface to obtain a second difference frequency signal,
   and a phase sensitive detector for measuring the phase difference between said first and second difference frequency signals.

2. Apparatus according to claim 1 wherein said means for directing said converted signal and said reflecting energy consists of a transmitting antenna and a receiving antenna facing each of said surfaces.

3. Apparatus according to claim 1 wherein said means for directing said converted signal and said reflecting signal consists of a plurality of transmitting-receiving systems facing opposite surfaces of said object for directing said converted signal and said reflecting energy an equal number of times.

References Cited

UNITED STATES PATENTS

| | | | |
|---|---|---|---|
| 2,640,190 | 5/1953 | Rines | 324—58.5 |
| 2,970,258 | 1/1961 | Sinclair. | |
| 3,117,276 | 1/1964 | Beyer et al. | 324—58.5 |
| 3,258,688 | 6/1966 | Augustine et al. | 324—58.5 |
| 3,265,967 | 8/1966 | Heald | 324—58 |
| 3,267,357 | 8/1966 | Ravenhill et al. | |

RUDOLPH V. ROLINEC, Primary Examiner

P. F. WILLE, Assistant Examiner

U.S. Cl. X.R.

324—57